United States Patent
Kasuga et al.

(10) Patent No.: US 8,692,177 B2
(45) Date of Patent: Apr. 8, 2014

(54) SOLID-STATE IMAGING DEVICE INCLUDING ANALOG-TO-DIGITAL CONVERTER AND ANALOG-TO-DIGITAL CONVERSION METHOD

(75) Inventors: Shigetaka Kasuga, Osaka (JP); Motonori Ishii, Osaka (JP); Sanzo Ugawa, Osaka (JP); Yusuke Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 35 days.

(21) Appl. No.: 13/562,062

(22) Filed: Jul. 30, 2012

(65) Prior Publication Data

US 2012/0292485 A1 Nov. 22, 2012

Related U.S. Application Data

(63) Continuation of application No. PCT/JP2010/004927, filed on Aug. 5, 2010.

(30) Foreign Application Priority Data

Feb. 8, 2010 (JP) ................................ 2010-025396

(51) Int. Cl.
*H01L 27/00* (2006.01)
*H01J 40/14* (2006.01)
*H03K 17/78* (2006.01)

(52) U.S. Cl.
USPC .............. 250/208.1; 250/214 R; 250/214 DC

(58) Field of Classification Search
USPC .................. 250/208.1, 214.1, 214 R, 214 DC; 348/241, 207.99, 266, 272, 281–283, 348/294, 302–304, 311, 322–324, 332; 377/52, 53, 56, 57, 60, 63, 111, 116, 377/44, 55, 94, 130
See application file for complete search history.

(56) References Cited

U.S. PATENT DOCUMENTS

| 5,877,715 A | * | 3/1999 | Gowda et al. ................. 341/122 |
| 7,495,597 B2 | * | 2/2009 | Muramatsu et al. .......... 341/164 |

(Continued)

FOREIGN PATENT DOCUMENTS

| JP | 2005-323331 A | 11/2005 |
| JP | 2008-172609 A | 7/2008 |
| JP | 2008-172609 A | 7/2008 |

OTHER PUBLICATIONS

International Search Report issued in International Patent Application No. PCT/JP2010/004927, mailed Aug. 31, 2010.

*Primary Examiner* — Pascal M Bui Pho
(74) *Attorney, Agent, or Firm* — McDermott Will & Emery LLP

(57) ABSTRACT

A solid-state imaging device includes an imager including pixels arranged in a matrix, and analog to digital (AD) converters, each of which is provided in each pixel column and converts a signal voltage read from one of the pixels located in the column to a digital value. Each of the AD converters includes a comparator and a counter section including a counter circuit, which receives a comparison result of the comparator and includes a first D flip-flop (DFF) for n-bits, and a transfer circuit, which includes a second DFF for n-bits holding and outputting a count value of the counter circuit. The second DFFs provided in the columns are coupled in series to form a transfer section transferring the signal voltage which has been digitally converted.

7 Claims, 9 Drawing Sheets

(56) References Cited

U.S. PATENT DOCUMENTS

| | | | |
|---|---|---|---|
| 7,928,889 B2 * | 4/2011 | Sakurai | 341/169 |
| 7,990,304 B2 * | 8/2011 | Lim et al. | 341/164 |
| 8,334,913 B2 * | 12/2012 | Sakurai et al. | 348/241 |
| 2005/0206548 A1 | 9/2005 | Muramatsu et al. | |
| 2006/0097902 A1 | 5/2006 | Muramatsu et al. | |
| 2008/0111059 A1 * | 5/2008 | Lee et al. | 250/214 DC |
| 2009/0167586 A1 | 7/2009 | Shimomura et al. | |
| 2011/0242377 A1 * | 10/2011 | Korekado et al. | 348/294 |

* cited by examiner

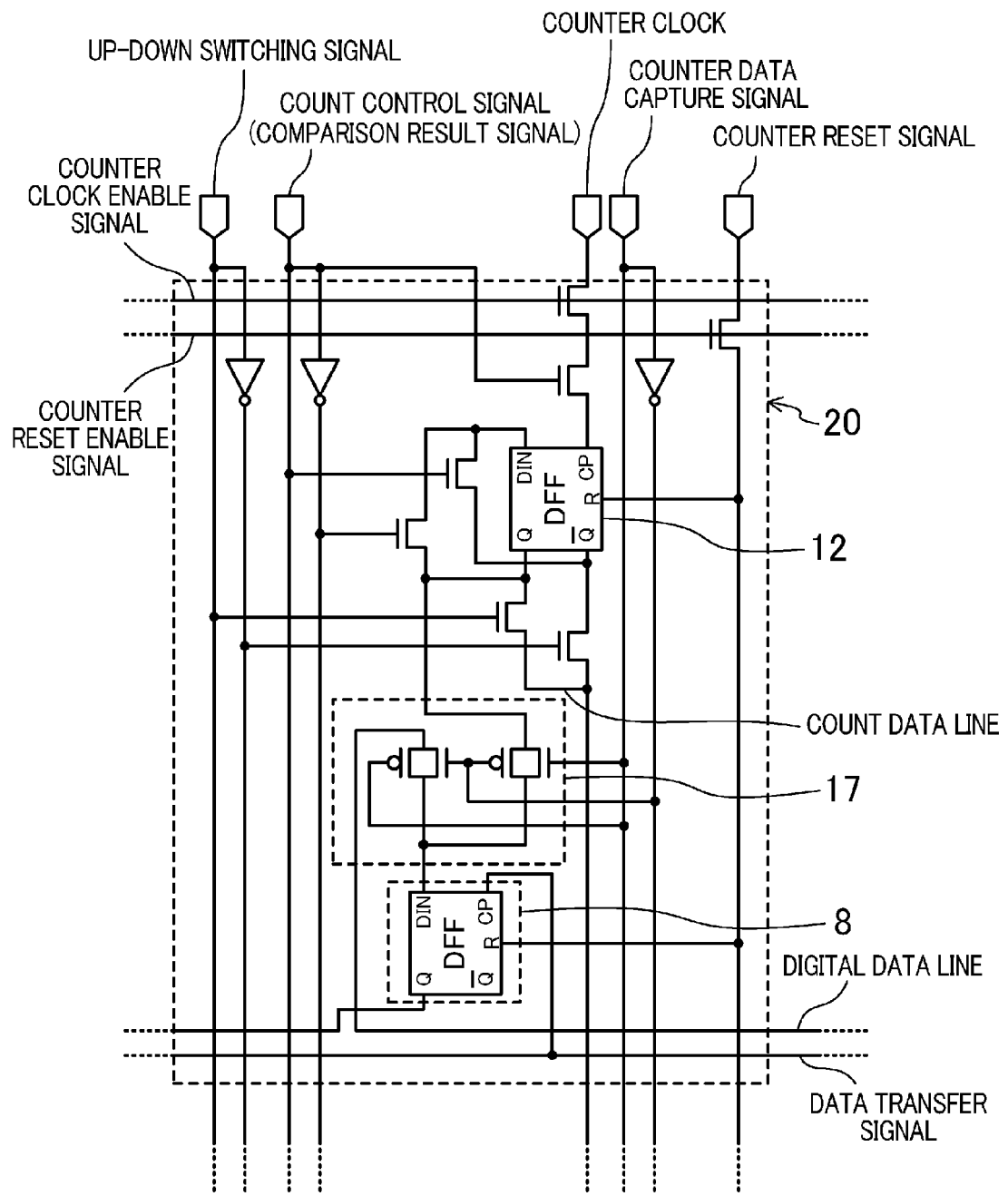

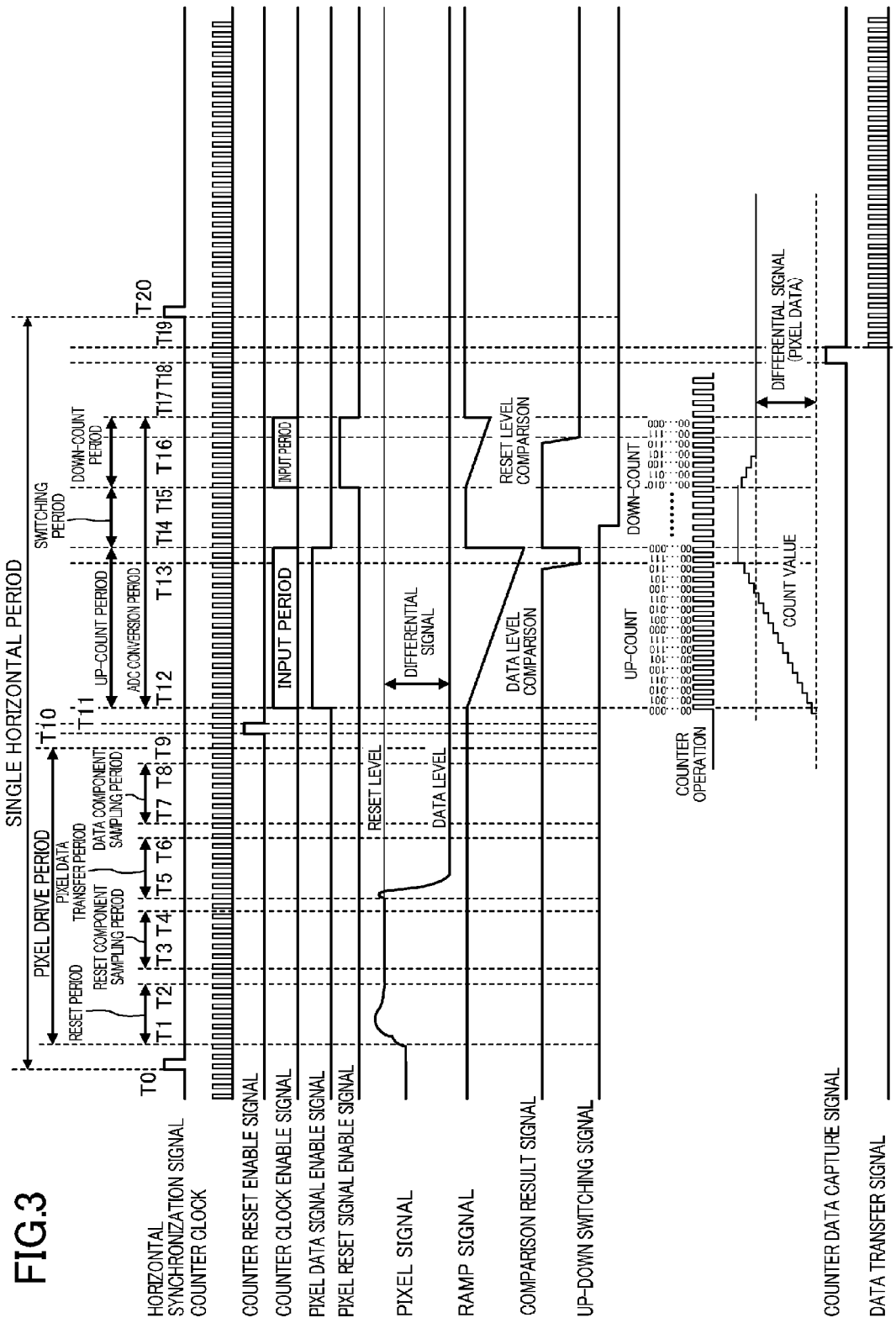

US 8,692,177 B2

SOLID-STATE IMAGING DEVICE INCLUDING ANALOG-TO-DIGITAL CONVERTER AND ANALOG-TO-DIGITAL CONVERSION METHOD

CROSS-REFERENCE TO RELATED APPLICATION

This is a continuation of PCT International Application PCT/JP2010/004927 filed on Aug. 5, 2010, which claims priority to Japanese Patent Application No. 2010-025396 filed on Feb. 8, 2010. The disclosures of these applications including the specifications, the drawings, and the claims are hereby incorporated by reference in their entirety.

BACKGROUND

The present disclosure relates to solid-state imaging devices, and more particularly to techniques of converting light reception signals obtained by photoelectric conversion to digital signals and outputting the signals outside chips.

In recent years, with a dramatic increase in the pixel number of a solid-state imaging device, high-speed reading of signals from the solid-state imaging device has been increasingly demanded.

In an initial MOS solid-state imaging device, an analog signal obtained in a pixel circuit as a result of photoelectric conversion was read outside from a solid-state imaging device, and the analog signal is converted by an external analog-digital (AD) converter, thereby obtaining a digital signal. With this configuration, however, an improvement in the reading speed is limited due to floating capacitance existing inside the solid-state imaging device.

In order to address the problem, a technique is suggested, which increases the speed of outputting signals by converting analog signals generated in a pixel circuit to digital signals in a solid-state imaging device to reduce influences of floating capacitance, etc. (See, for example, Japanese Patent Publication No. 2005-323331).

FIG. 7 is a schematic block diagram illustrating a configuration of a major portion of the solid-state imaging device shown in Japanese Patent Publication No. 2005-323331. The solid-state imaging device converts a signal voltage from a unit pixel 101 to a digital signal by single-slope AD conversion. Rough operation of the solid-state imaging device will be described below.

The unit pixel 101 in an imager 103 applies a signal voltage obtained by photoelectric conversion to one input terminal of a comparator 105. A reference signal generator 107 generates a ramp signal using, for example, a digital-analog (DA) converter, and applies the signal to the other input terminal of the comparator 105. The voltage of the ramp signal monotonically rises in synchronization with a clock signal CK supplied by a timing controller 109. For example, a counter flip-flop 109, which is indicated by "T-FF" in FIG. 7, starts counting the clock signal CK in synchronization with the start of the rise of the ramp signal voltage. When the level of a signal (i.e., a comparison result signal shown in FIG. 7) indicating that the level of the ramp signal from the comparator 105 coincides with the signal voltage from the unit pixel 101 changes, the counter flip-flop 109 outputs the count value at that time as a digital signal indicating the signal voltage output from the unit pixel 101.

SUMMARY

According to the conventional technique, however, each of AD converters (ADCs) provided in columns includes a single comparator 105, a latch 111 for each bit, an impedance-converting amplifier 113, which is indicated by "BUFAMP" in FIG. 7, and a transfer switch to a horizontal data bus. Since the horizontal data bus requires a sense amplifier, the number of the circuit elements increases.

Since the design and layout of interconnection of the horizontal data bus maintain factors as an analog circuit, interconnects need to be changed in a predetermined period to reduce influences of signal interference. Moreover, skew between bits caused by interconnect resistance and capacitance needs to be considered. As such, high-speed transfer is limited in a conventional technique.

The situation will be described hereinafter with reference to FIGS. 8 and 9.

FIG. 8 is a circuit for expressing a least significant bit in the ADC of FIG. 7. FIG. 9 illustrates an operation sequence. The period between times T0 and T20 is a single horizontal period. The period between times T1 and T9 is a pixel drive period for reading a photoelectric conversion signal from a pixel. The pixel circuit is reset in the period between times T1 and T2, a reset signal (hereinafter referred to as a "reset level") of the pixel is sampled in the period between times T3 and T4, and temporarily stored in a reset signal memory 401. The photoelectric conversion signal (hereinafter referred to as a "data level") of the pixel is read in the period between times T5 and T6, and temporarily stored in a pixel signal memory 402 in the period between times T7 and T8. The counter reset enable signal is turned on (herein set to a high level) in the period between times T10 and T11 to reset the counters of all bits. After that, in the period between times T12 and T13, a counter clock enable signal and a pixel data signal enable signal are both turned on (herein set to a high level) to input a pixel data level to one input terminal of the comparator 105. Also, in the period between times T12 and T14, a ramp signal is input to the other input terminal of the comparator 105. At this time, the counters are counting up. In the period between times T12 and T14, at time T13 when the pixel data level coincides with a ramp signal level, the level of the comparison result signal (hereinafter referred to as a "count control signal") from the comparator 105 is inverted to stop the counter DFF, thereby stopping the count operation.

Next, the ramp signal is reset in the period between times T14 and T15. When the up-down switching signal is inverted, the counter DFF starts counting down from time T15.

In the period between times T15 and T17, the counter clock enable signal and a pixel reset signal enable signal are both turned on (herein set to a high level) to input the reset level from the reset signal memory 401 to the one input terminal of the comparator 105. Also, in the period between times T15 and T17, the ramp signal is input to the other input terminal of the comparator 105.

Then, in the period between times T15 and T17, at time T16 when the pixel reset level coincides with the ramp signal level, the level of the comparison result signal from the comparator 105 is inverted to stop the counter DFF, thereby stopping the count operation. The count value at this time is the value obtained by subtracting the down-counted value from the up-counted value and is eventually the value obtained by subtracting the reset level form the data level of the pixel, i.e., a data signal from which a noise signal of the pixel has been removed. This operation enables what is called "digital correlated double sampling." At time T18, this count value is transferred to the latch 111 with a count data capture signal, and then after time T19, count values are sequentially transferred to the horizontal data bus with a column selection signal from a column scan circuit.

In the conventional solid-state imaging device, when the digital values are transferred from the ADC to the horizontal data bus, data is degraded by parasitic capacitance. Thus, at the end of the horizontal data bus, a sense amplifier is often provided to recover the degradation in the data, thereby causing difficulty in reducing the circuit area. Where a plurality of data busses are arranged in parallel, interference is often reduced by crossing data bus interconnects at predetermined intervals. However, as the circuit is miniaturized, the influence of interference between the data busses increases.

The present disclosure is made in view of the problems. According to an aspect of the present disclosure, the speed of operation can be increased and degradation in a signal output outside can be reduced, while mitigating an increase in a circuit scale.

In order to achieve the objective, a solid-state imaging device according to an aspect of the present disclosure includes an imager including pixels arranged in a matrix, each pixel including a pixel circuit converting light to a signal voltage; and AD converters, each provided in each of columns of the pixels, and configured to convert the signal voltage read from the pixel arranged in the column to a digital value of n bits, where n is a positive integer. Each of the AD converters includes a comparator comparing the signal voltage to a reference signal, and outputting a comparison result signal, and a counter section including a counter circuit having a first DFF for n bits of which operation is controlled by a signal level of the comparison result signal, and a transfer circuit having a second DFF for n bits holding a count value of the counter circuit once and then outputting the count value. The second DFFs provided in the columns are coupled in series to form a transfer section. The transfer section outputs the signal voltage which has been converted to the digital value of n bits.

With this configuration, in the AD converter, the first DFF forms the counter circuit, and the second DFF forms the transfer circuit which holds (latches) and transfers the count value of the counter circuit indicating the signal voltage. This simplifies the circuit configuration of the AD converter as compared to the conventional solid-state imaging device. Also, since the AD converter as a whole is formed by the digital circuits, data is easily handled. Moreover, the signal data can be transferred in a horizontal direction by the transfer section having the second DFF. This reduces degradation in the signal data as compared to the conventional solid-state imaging device, and enables stable high-speed digital conversion.

Note that the counter circuit preferably performs up-count operation and down-count operation, since noise can be easily removed.

An AD conversion method according to an aspect of the present disclosure uses a solid-state imaging device including an imager including pixels arranged in a matrix, and column AD converters, each provided in each of columns of the pixels and including a comparator and a counter section including a counter circuit having a first DFF, and a transfer circuit having a second DFF receiving an output of the counter circuit, where the second DFFs being provided in the columns are coupled in series to form a transfer section. The method includes the steps of: (a) comparing each of signal voltages read from the pixels to a reference signal using the comparator; (b) counting a clock signal using the counter circuit, and stopping counting when the signal voltage is equal to a level of the reference signal in the step (a); (c) after the step (b), receiving a count value output from the counter circuit using the transfer circuit, and holding the count value as the signal voltage which has been digitally converted; and (d) transferring in a horizontal direction, the signal voltage held in the transfer circuit via the transfer section.

By this AD conversion method, the circuit area can be reduced as compared to a conventional method, and the digitally converted signal voltage can be transferred using the transfer section having the second DFF. This transfers the signal voltage at high speed and reduces degradation in the signal voltage.

In the solid-state imaging device according to the aspect of the present disclosure, each of AD converters provided in the columns includes the counter circuit having the first DFF, and the transfer circuit having the second DFF. Thus, the digital value obtained by the counter circuit can be output as a signal voltage outside the solid-state imaging device via the transfer circuit in each column. As compared to a conventional solid-state imaging device, the configuration of the AD converter is simplified. Since signal voltages can be transferred via the transfer circuits of the digital circuits, degradation in the signal voltages can be reduced. Furthermore, the digitally converted signal voltages can be output outside without providing an extra sense amplifier. As a result, the circuit area can be largely reduced as compared to a conventional device, and high-speed transfer of signal voltages can be provided even if miniaturization of circuits proceeds.

BRIEF DESCRIPTION OF THE DRAWINGS

FIG. 2 is a circuit diagram illustrating a specific configuration example of a counter 20 for the least significant bit shown in FIG. 1.

FIG. 3 is a timing chart illustrating the operation of the solid-state imaging device according to the first embodiment.

DETAILED DESCRIPTION

Embodiments of the present disclosure will be described hereinafter with reference to the drawings.

First Embodiment

Figure 1:
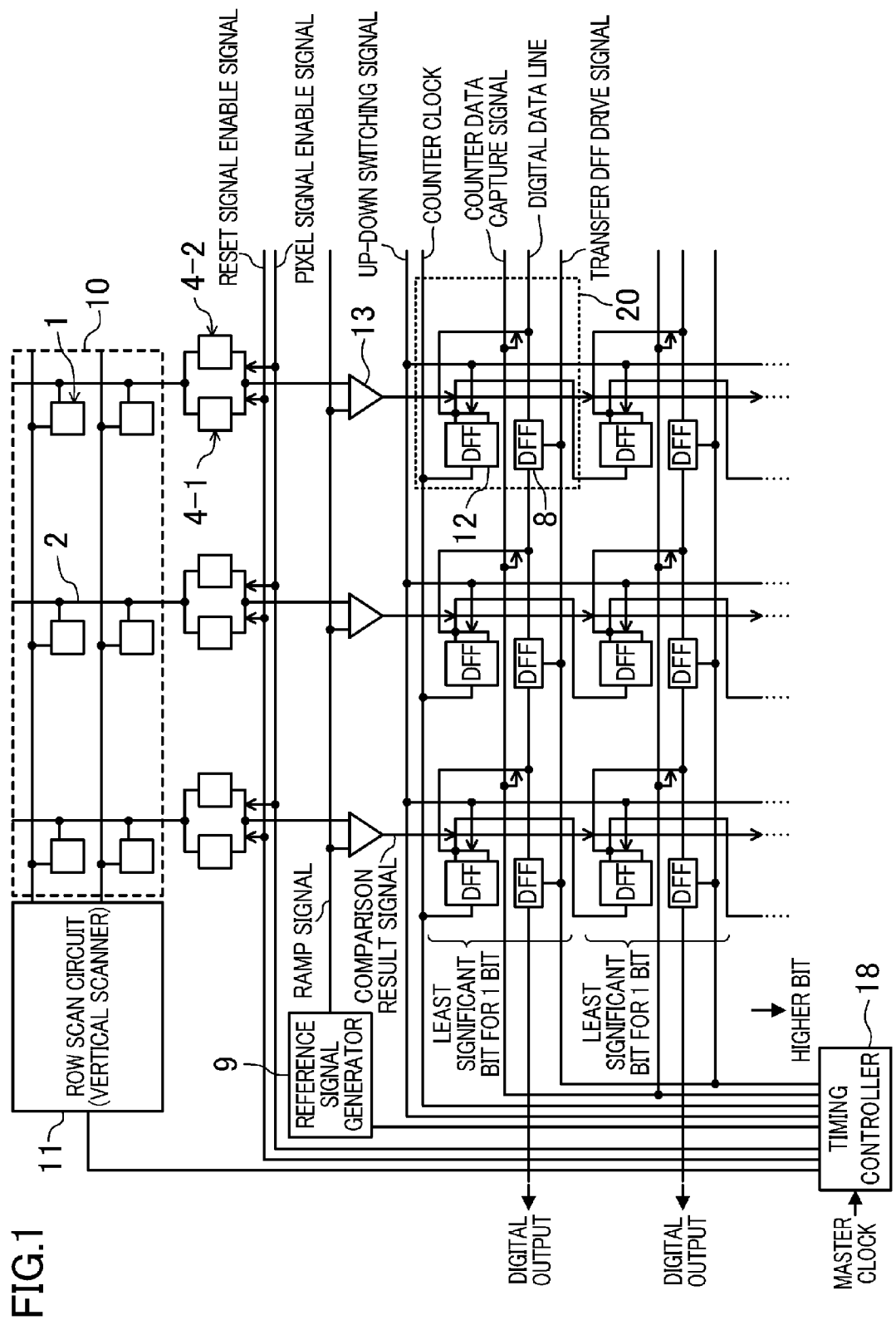
FIG. 1 is a block diagram of an example solid-state imaging device according to a first embodiment of the present disclosure.

FIG. 1 is a block diagram of an example solid-state imaging device according to a first embodiment of the present disclosure.

The solid-state imaging device shown in FIG. 1 converts an analog signal generated by photoelectric conversion of a light-receiving element to a digital signal, and outputs the digital signal obtained by AD conversion outside the chip (i.e., the solid-state imaging device). The solid-state imaging device according to this embodiment includes an imager 10 formed by arranging a plurality of unit pixels 1, a vertical signal line 2 located in the imager 10 and coupled to the unit pixels 1, a row scan circuit 11 located adjacent to the imager 10, a comparator 13 coupled to the vertical signal line 2, a reference signal generator 9 outputting a ramp signal to the comparator 13, a counter D-flip-flop (i.e., a first DFF; a D-flip-flop is hereinafter referred to as a "DFF") 12 of which operation is controlled by a signal level of a comparison result signal output from the comparator 13, a transfer DFF (i.e., a second DFF) 8, and a timing controller 18 outputting a clock signal such as a counter clock.

The unit pixels 1 are arranged in a matrix of, for example, l rows and m columns, where l is a positive integer and m is an integer of two or more. Each of the unit pixels 1 includes a pixel circuit including at least one light-receiving element generating a photoelectric conversion signal (hereinafter referred to as a "data signal") depending on the intensity of received light.

In the example shown in FIG. 1, the vertical signal line 2 is provided in each of the columns of the unit pixels 1. That is, each vertical signal line 2 is coupled to the plurality of unit pixels 1 forming a same column. A pixel data memory 4 is provided in the vertical signal line 2 between the unit pixels 1 and the comparator 13.

The single comparator 13, a counter circuit including the counter DFF 12 for n bits, and a transfer circuit including the transfer DFF 8 for n bits form a single AD converter (i.e., a column ADC). The counter circuit for n bits and the transfer circuit for n bits form a single counter section. The counter circuit performs up-count operation and down-count operation as described below.

In an AD converter, one or more counter DFFs 12 corresponding to each bit, and one or more transfer DFFs 8 corresponding to the counter DFFs 12 form a counter 20 for 1 bit. Counters 20 for bits form a counter section for n bits. An output of each transfer DFF 8 is coupled to an input of another transfer DFF 8 located in a column adjacent to the transfer DFF 8 by a digital data line. The transfer DFFs 8 in the columns are coupled in series, thereby forming a transfer section which transfers signal data of n bits in a horizontal direction. The transfer section is formed by arranging circuits for n bits in parallel in each column. Each of the circuit is formed by coupling the transfer DFFs 8 for a same bit in series.

Figure 7:
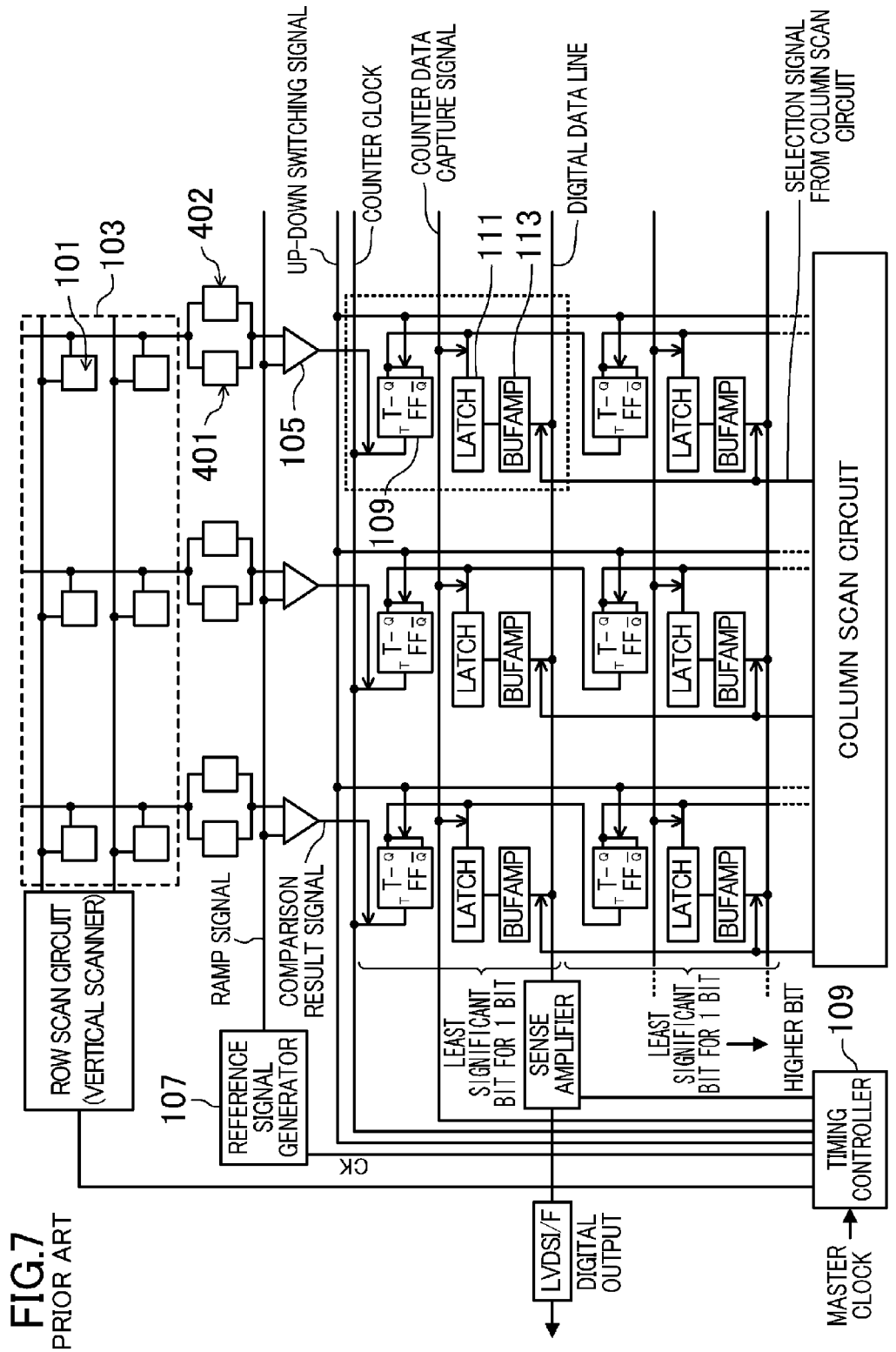
FIG. 7 is a schematic block diagram illustrating the configuration of a major portion of a conventional solid-state imaging device.
Figure 8:
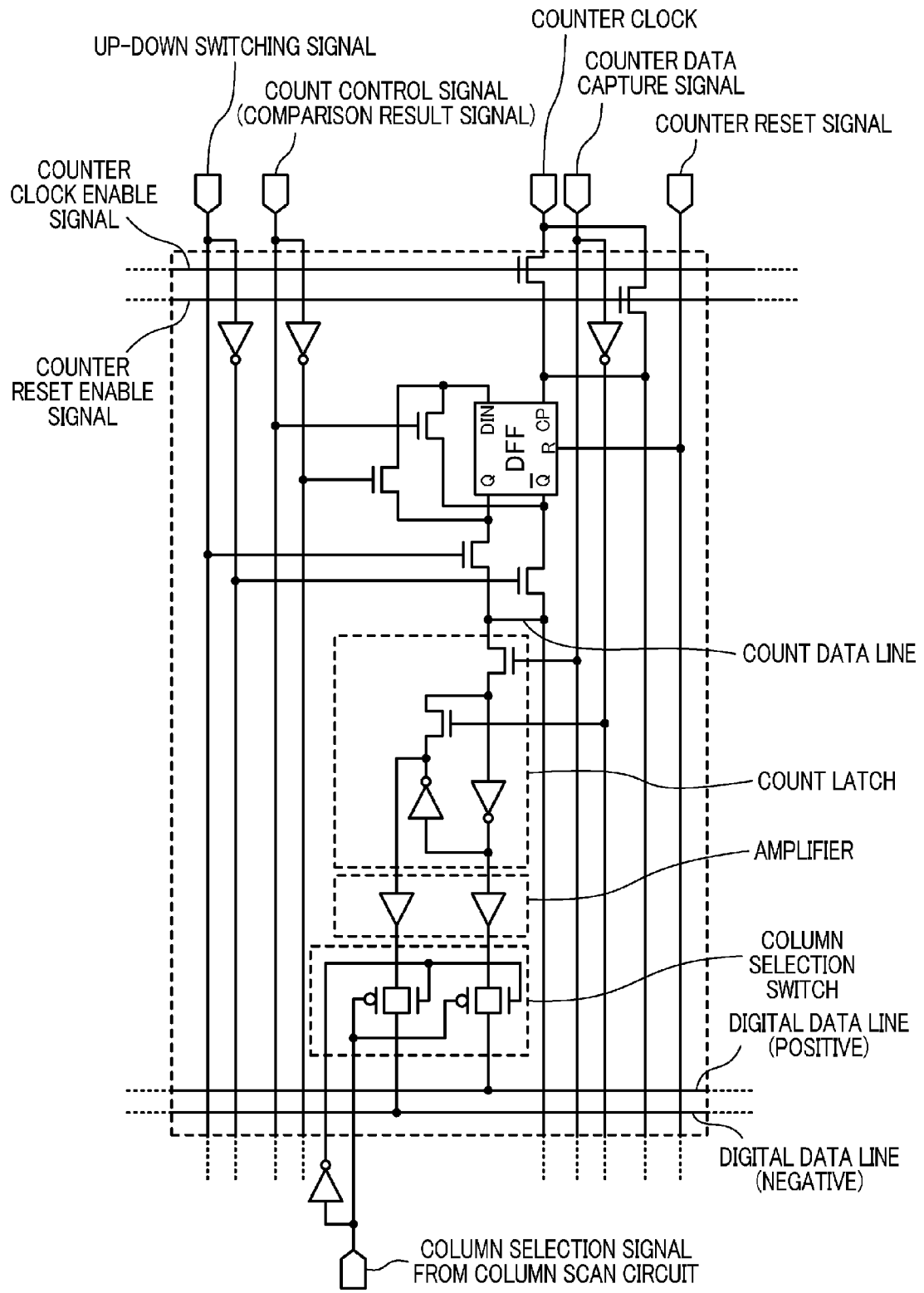
FIG. 8 illustrates a circuit configuration of a counter for the least significant bit in the conventional solid-state imaging device shown in FIG. 7.
Figure 9:
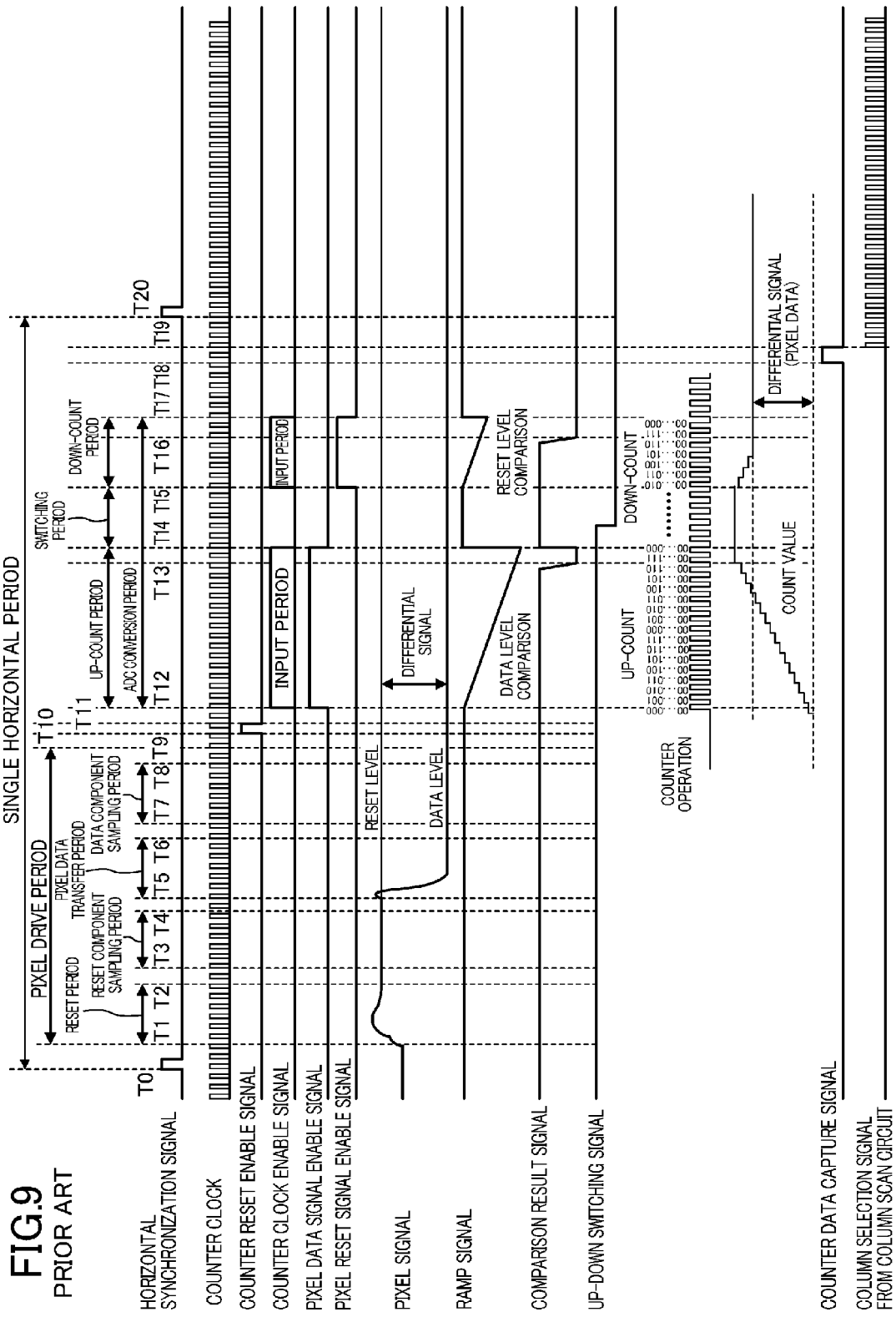
FIG. 9 is a timing chart illustrating the operation of the conventional solid-state imaging device.

The solid-state imaging device according to this embodiment has a different configuration for AD conversion from the conventional solid-state imaging device shown in FIG. 7. The bit number of AD conversion is not limited. With an increase in the bit number, a higher-definition image can be obtained, but the circuit area increases.

The AD converter is provided in each column of the pixels. Data for 1 bit is held and transferred by the above-described counter 20 for 1 bit including the counter DFF 12 controlled by the timing controller 18, and the transfer DFF 8 receiving an output of the counter DFF 12. An output of the transfer DFF 8 is input to another transfer DFF 8 adjacent to the transfer DFF 8.

The timing controller 18 is controlled by, for example, a master clock supplied from the outside of the solid-state imaging device. The timing controller 18 outputs control signals such as an up-down switching signal, a counter clock, a counter data capture signal, and a transfer DFF drive signal, which are described below, and controls operation of the reference signal generator 9 and the row scan circuit 11.

FIG. 2 is a circuit diagram illustrating a specific configuration example of the counter 20 for the least significant bit shown in FIG. 1.

In the example of FIG. 2, the counter DFF 12 in the counter 20 includes a clock terminal CP for receiving a counter clock, a reset terminal R for receiving a counter reset signal, and output terminals Q and –Q, which indicates Q bar. An output of the counter DFF 12 is output to the transfer DFF 8 via a data selection switch 17 formed by a CMOS etc. in a predetermined case. The transfer DFF 8 includes, for example, a MOS transistor and an inverter.

Next, an outline of the operation of the solid-state imaging device according to this embodiment will be described.

First, a reset signal generated in initialization of a unit pixel 1 is sent from the pixel to a reset signal memory 4-1 via the vertical signal line 2 and held in the reset signal memory 4-1. Next, a data signal generated depending on the light intensity is sent to a pixel signal memory 4-2 via the vertical signal line 2 and held in the pixel signal memory 4-2. When each of the signals is input to one terminal of the comparator 13 from the two memories, the ramp signal (i.e., a reference signal) from the reference signal generator 9 is input to the other terminal of the comparator 13 at the same time. At the time when the levels of the signals input to the both terminals coincide, the level of the comparison result signal from the comparator 13 is inverted to stop count operation of the counter DFF 12, which counts the counter clock signal generated in the timing controller 18.

The count values at this time are transferred as digital values to the transfer DFFs 8 and are read out to an external terminal sequentially (e.g., sequentially from the left column to the right column, or from the right column to the left column) by the transfer DFF drive signal supplied by the timing controller 18. In this operation, the voltage of the reset signal and the voltage of the data signal, which are output from the same unit pixel, are used to enable correlated double sampling. A signal is obtained, from which noise data of an individual unit pixel has been removed.

AD converting operation will be described further in detail with reference to FIGS. 2 and 3.

FIG. 3 is a timing chart illustrating the operation of the solid-state imaging device according to this embodiment.

The period between times T0 and T20 shown in FIG. 3 is a single horizontal period. In this single horizontal period, a unit pixel 1 for a single row is reset, a data signal is read from the unit pixel 1 for the single row, and the data signal is converted to digital data and output outside.

The period between times T1 and T9 in the single horizontal period is a pixel drive period for reading the data signal from the pixel. Specifically, a pixel circuit is reset in the period (i.e., a reset period) between times T1 and T2. The reset level of the pixel is sampled and temporarily stored in the reset signal memory 4-1 in the period (i.e., a reset component sampling period) between times T3 to T4. Next, the data signal of the pixel is read in the period (i.e., a pixel data transfer period) between times T5 and T6, and temporarily stored in the pixel signal memory 4-2 in the period (i.e., a data component sampling period) between times T7 and T8.

Then, a counter reset enable signal is turned on (i.e., set to a high level in the example of FIG. 3) in the period between times T10 and T11 to reset the counters 20 for all bits.

After that, in the period (i.e., an up-count period) between times T12 and T14, a counter clock enable signal and a pixel data signal enable signal are turned on to input the data signal stored in the pixel signal memory 4-2 to one input terminal of the comparator 13, and the ramp signal to the other input terminal of the comparator 13. At this time, the counters 20 for all bits perform up-count. In the period between times T12 and T14, at time T13 when the pixel data level (i.e., the voltage of the data signal) and the ramp signal level coincide, the level of the comparison result signal from the comparator 13 is inverted to stop the operation of the counter DFFs 12 for all bits, thereby stopping the count operation.

Next, in the period (i.e., a switching period) between times T14 and T15, when the ramp signal is reset, and the level of the up-down switching signal is inverted, the counter DFFs 12 for all bits start counting down from time T15 when the voltage of the ramp signal starts monotonously changing. The period between times T15 and T17 is a down-count period.

In the period between times T15 and T17, the reset level stored in the reset signal memory 4-1 is input to the one input terminal of the comparator 13, and the ramp signal is input to the other input terminal of the comparator 13. In the period between times T15 and T17, at time T16 when the pixel reset level and the ramp signal level coincide, the level of the comparison result signal from the comparator 13 is inverted to stop the operation of the counter DFF 12, thereby stopping the count operation. The count value at this time is the value obtained by subtracting the down-counted value from the up-counted value, and is thus, the value obtained by subtracting the reset level from the data level of the pixel. This count value indicates the data signal from which a noise signal has been removed in the unit pixel 1. As such, what is called "digital correlated double sampling" is performed, which provides a noise removal effect equal to or more than that of analog correlated double sampling, thereby improving image quality.

Next, at time T18, this count value is transferred as a digital value to the transfer DFF 8 via the data selection switch 17, which is turned on by a count data capture signal. Then, from time T19, count values held in the transfer DFFs 8 are sequentially output to the external terminal by a transfer DFF drive signal. At this time, the count values are output to the external terminal from column ADCs provided in the columns.

In the solid-state imaging device according to this embodiment, since AD conversion is performed using the counter including the counter DFF 12 and the transfer DFF 8, the configuration of each column ADC can be simplified as compared to a conventional solid-state imaging device. Also, since data of n bits are transferred in the horizontal direction using the transfer DFFs 8, deterioration of signal data occurring in transfer is basically prevented as compared to a conventional drive method. As a result, there is no need to provide a horizontal data bus, a column scan circuit, and a sense amplifier.

Since the signal memories and the comparator 13 are as a hole, formed by digital circuits, signal data can be easily processed, thereby reducing the circuit area using a miniaturized process.

Therefore, the solid-state imaging device according to this embodiment reduces a chip area, provides high-speed transfer of signal data, and reduces degradation in the signal data which are output outside.

Figure 4A:
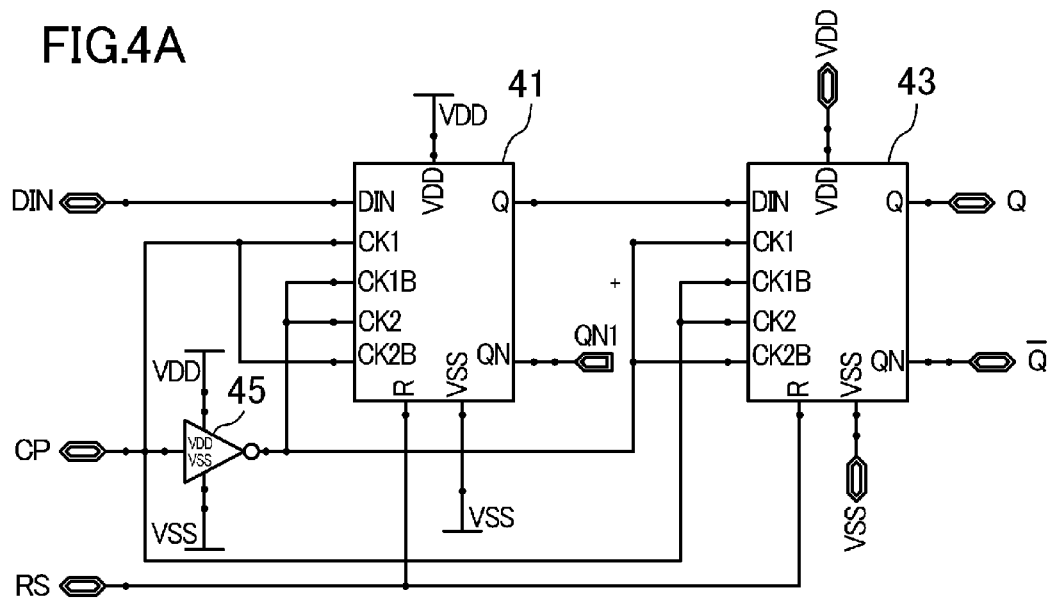
FIG. 4A illustrates a specific configuration example of a counter DFF 12 shown in FIGS. 1 and 2.
Figure 4B:
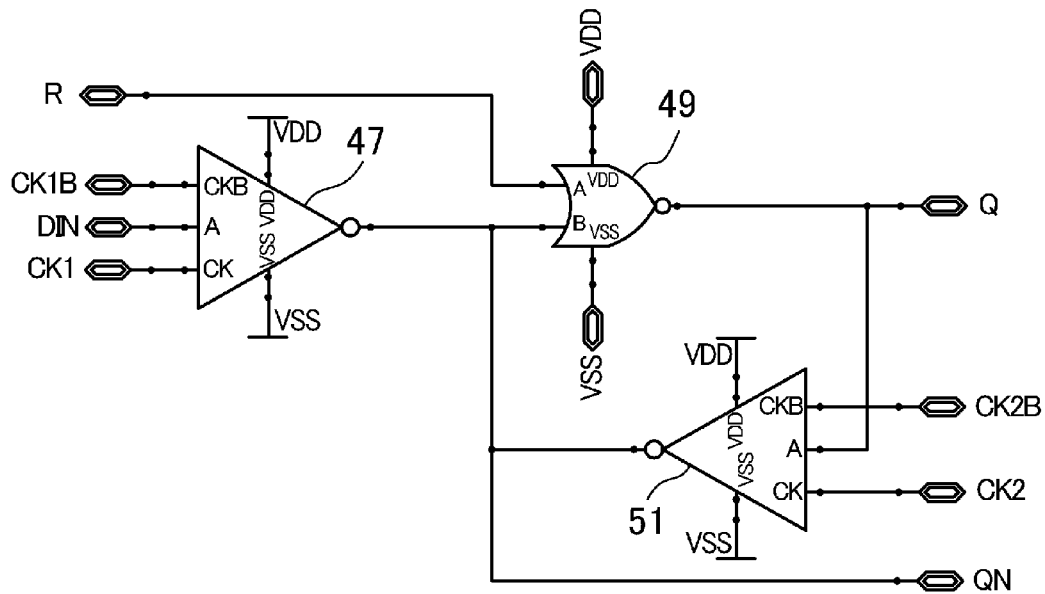
FIG. 4B illustrates a specific configuration example of a transfer DFF 8.

FIG. 4A illustrates a specific configuration example of the counter DFF 12 shown in FIGS. 1 and 2. FIG. 4B illustrates a specific configuration example of the transfer DFF 8.

As shown in FIG. 4A, the counter DFF 12 includes, for example, a first latch circuit 41, a second latch circuit 43 receiving an output of the first latch circuit 41, and an inverter 45. As shown in FIG. 4B, the transfer DFF 8 includes, for example, a first inverter 47, a second inverter 51, and a NOR circuit 49 having an input terminal coupled to outputs of the first inverter 47 and the second inverter 51.

Second Embodiment

Figure 5:
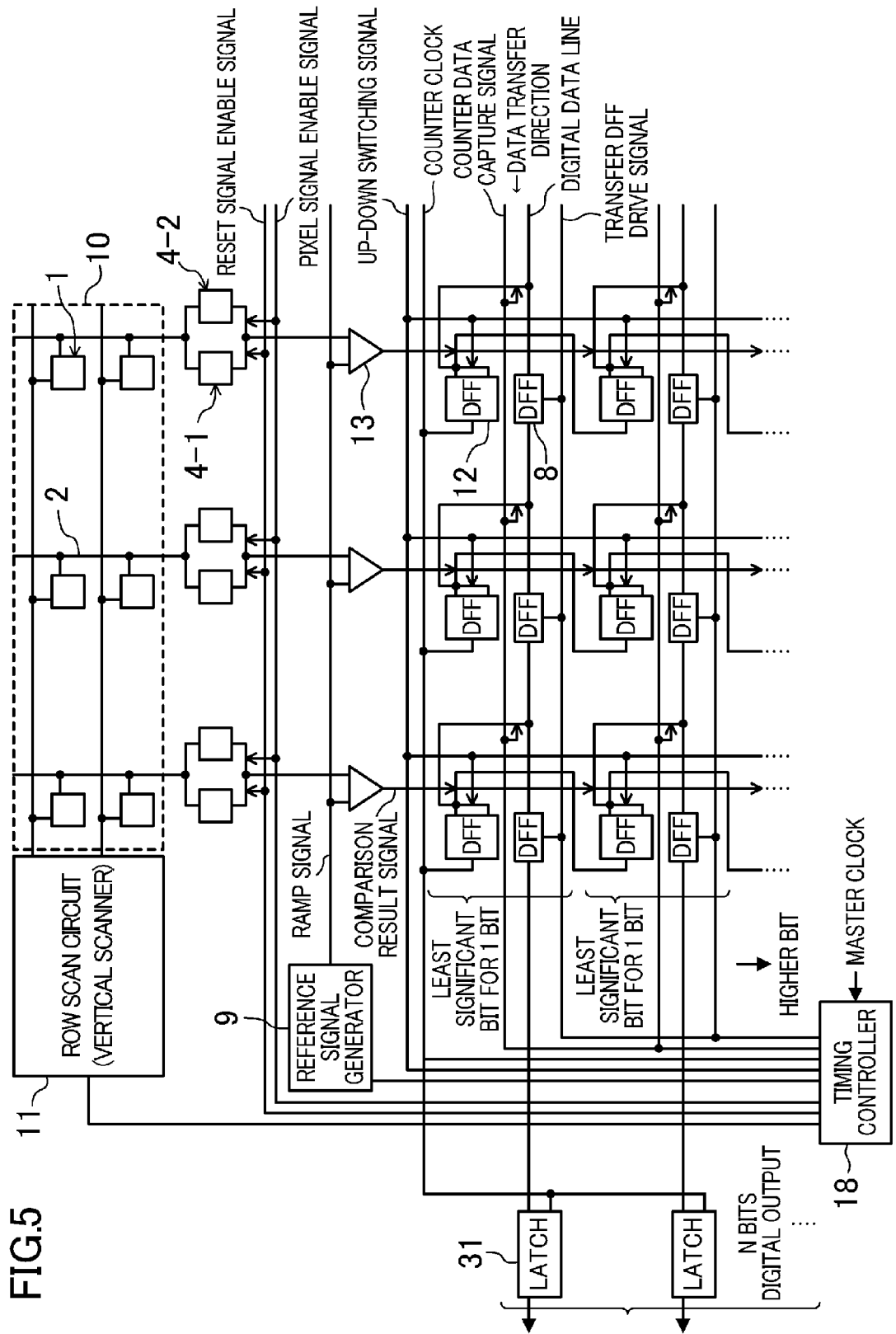
FIG. 5 is a block diagram of an example solid-state imaging device according to a second embodiment of the present disclosure.

FIG. 5 is a block diagram of an example solid-state imaging device according to a second embodiment of the present disclosure.

Similar to the solid-state imaging device shown in FIG. 1, in the solid-state imaging device according to this embodiment, transfer DFFs 8, which hold and transfer the same bit in a column ADC in each column, are coupled in series by a digital data line to form a transfer section. The transfer section formed by the plurality of transfer DFFs 8 sequentially outputs signal data for n bits to the outside in a pixel data transfer period. In this embodiment, the bit number n of AD conversion is two or more.

In the solid-state imaging device according to this embodiment, latch circuits 31 receiving the same pulse are coupled to outputs of the transfer DFFs 8 in the last column out of the transfer DFFs 8 forming the transfer section for n bits. In this configuration, since the latch circuits 31 for n bits performing output at the same timing are provided, outputs of n bits can be synchronized, and skew caused in the n bits can be removed. This reliably enables high-speed transfer of signal data.

In the example of FIG. 5, counter clocks having the same frequency and being synchronized with drive signals of the transfer DFFs 8 are input to the latch circuits 31. The counter clocks are output from a timing controller 18, which is provided on a same chip as the column ADCs and the imager 10, and receives a master clock.

Variation of Second Embodiment

Figure 6:
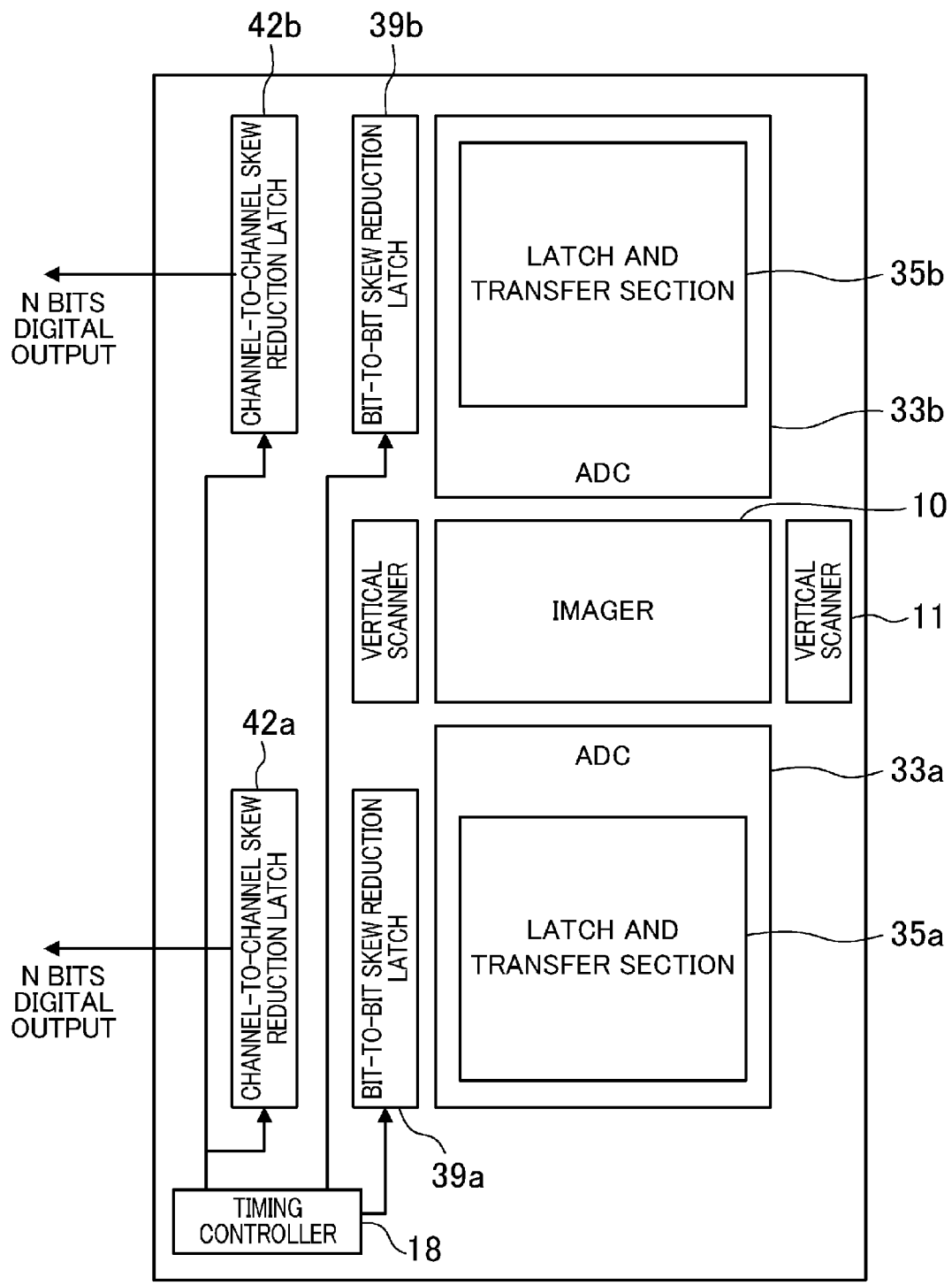
FIG. 6 is a schematic block diagram of a solid-state imaging device according to a variation of the second embodiment.

FIG. 6 is a schematic block diagram of a solid-state imaging device according to a variation of a second embodiment of the present disclosure.

If channel-to-channel skew is reduced in reading signal data at high speed from a solid-state imaging device with numbers of pixels via a plurality of channels, higher reliable high-speed transfer is possible. This variation provides a solid-state imaging device in which a bit-to-bit skew reduction latch formed by the latch circuits 31 of n bits shown in FIG. 5 is applied to a transfer section of a plurality of channels.

The solid-state imaging device according to this embodiment includes, for example, an imager 10, vertical scanners (i.e., row scan circuits 11) provided at both sides of the imager 10, counters (i.e., latch and transfer sections 35a and 35b shown in FIG. 6) formed by a counter DFF and a transfer DFF located above and below the imager 10, ADCs 33a and 33b provided in different regions, a timing controller 18, a bit-to-bit skew reduction latch 39a receiving signal data transferred from the latch and transfer section 35a, a bit-to-bit skew reduction latch 39b receiving signal data transferred from the latch and transfer section 35b, a channel-to-channel skew reduction latch 42a receiving signal data output from the bit-to-bit skew reduction latch 39a, and a channel-to-channel skew reduction latch 42b receiving signal data output from the bit-to-bit skew reduction latch 39b.

Signal data read from a unit pixel is allotted to the latch and transfer sections 35a and 35b in the ADCs 33a and 33b, respectively, converted from analog to digital, and transferred. Each of the ADCs 33a and 33b includes a plurality of column ADCs.

Each of the bit-to-bit skew reduction latches 39a and 39b includes latch circuits 31 (see FIG. 5) for n bits controlled by the timing controller 18, and performing output at the same timing by receiving a same pulse. Each of the channel-to-channel skew reduction latches 42a and 42b includes latch circuits for n bits receiving outputs of the latch circuits 31 for n bits and performing output at the same timing by receiving a same pulse output from the timing controller 18.

As such, signal data of n bits is output via the plurality of paths, thereby reliably transferring the signal data at high speed, even if the data has a large pixel number. Furthermore, since the bit-to-bit skew reduction latches 39a and 39b are provided, skew occurring between the bits of the signal data can be reduced. Moreover, since the channel-to-channel skew reduction latches 42a and 42b are provided, skew of the signal data between different channels is reduced, thereby providing stable high-speed digital output. Furthermore, the circuit area can be reduced as compared to the case where signal data is output via a plurality of paths in a conventional solid-state imaging device.

Note that the specific configurations and operation methods of the circuits described above are merely the example embodiments, and thus can be changed and modified within the spirit and scope of the present disclosure. Combinations of the solid-state imaging devices of the above-described embodiments and variation are possible.

An example solid-state imaging device according to the present disclosure is widely applicable to a solid-state imaging device outputting as a digital signal, a signal voltage obtained by photoelectric conversion. The device is variously applicable, for example, to digital still cameras, digital video cameras, cameras for mobile terminals, cameras for vehicles, street cameras, security cameras, medical cameras, etc.

What is claimed is:

1. A solid-state imaging device comprising:
   an imager including pixels arranged in a matrix, each pixel including a pixel circuit converting light to a signal voltage; and
   analog to digital (AD) converters, each provided in each of columns of the pixels, and configured to convert the signal voltage read from the pixel arranged in the column to a digital value of n-bits, where n is a positive integer, wherein
   each of the AD converters includes:
       a comparator comparing the signal voltage to a reference signal, and outputting a comparison result signal, and
       a counter section including:
           a counter circuit having a first D flip-flop (DFF) for n-bits of which operation is controlled by a signal level of the comparison result signal, and
           a transfer circuit having a second DFF for n-bits holding a count value of the counter circuit once and then outputting the count value,
   the second DFFs provided in the columns are coupled in series to form a transfer section, and
   the transfer section outputs the signal voltage which has been converted to the digital value of n-bits.

2. The solid-state imaging device of claim 1, wherein
   the counter circuit performs up-count operation and down-count operation, and
   the counter circuit counts up the comparison result signal indicating the signal voltage read from the pixel and then counting down the comparison result signal indicating a reset level read from the pixel in a reset state, thereby outputting a count value indicating the signal voltage from which a noise component has been removed.

3. The solid-state imaging device of claim 1, wherein the counter circuit performs reset operation of all bits by receiving a reset signal without passing through a reset circuit.

4. The solid-state imaging device of claim 1, further comprising latch circuits for n-bits coupled to outputs of the second DFFs in a last column out of the second DFFs forming the transfer section, output timing of the latch circuits being synchronized by a same pulse,
   wherein the transfer section is formed by arranging circuits for n-bits in parallel, where n is an integer of two or more, each circuit being formed by coupling, in series, the second DFFs arranged in the columns and transferring a same bit.

5. The solid-state imaging device of claim 1, further comprising:
   a plurality of bit-to-bit skew reduction latches, each including latch circuits for n-bits coupled to outputs of the second DFFs in a last column out of the second DFFs forming the transfer section, output timing of the latch circuits being synchronized, and
   a plurality of channel-to-channel skew reduction latches receiving outputs of the bit-to-bit skew reduction latches, output timing of the channel-to-channel skew reduction latches being synchronized, wherein
   the AD converters are arranged in a plurality of different regions,
   the signal voltage read from the pixel is allotted to each of the AD converters arranged in a plurality of regions of the column of the pixels, and
   the transfer section located in each of a plurality of regions is formed by arranging in parallel, circuits for n-bits, where n is an integer of two or more, each circuit being formed by coupling, in series, the second DFFs arranged in the columns and transferring a same bit.

6. An analog to digital (AD) conversion method using a solid-state imaging device including an imager including pixels arranged in a matrix, and column AD converters, each provided in each of columns of the pixels and including a comparator and a counter section including a counter circuit having a first D flip-flop (DFF), and a transfer circuit having a second DFF receiving an output of the counter circuit, where the second DFFs being provided in the columns are coupled in series to form a transfer section, the method comprising the steps of:
   (a) comparing each of signal voltages read from the pixels to a reference signal using the comparator;
   (b) counting a clock signal using the counter circuit, and stopping counting when the signal voltage is equal to a level of the reference signal in the step (a);
   (c) after the step (b), receiving a count value output from the counter circuit using the transfer circuit, and holding the count value as the signal voltage which has been digitally converted; and
   (d) transferring in a horizontal direction, the signal voltage held in the transfer circuit via the transfer section.

7. The AD conversion method of claim 6, wherein
   the column AD converter performs AD conversion of n-bits, where n is an integer of two or more,
   the solid-state imaging device further includes latch circuits for n-bits coupled to outputs of the second DFFs for n-bits in a last column, output timing of the latch circuits being synchronized, and
   the method further includes the step of (e) receiving the signal voltages, which have been transferred from the transfer section in the step (d), using the latch circuits, and outputting the signal voltage of n-bits from the latch circuits at the same time using a same pulse.

* * * * *